United States Patent
Choi (10) Patent No.: US 7,813,151 B2
(45) Date of Patent: Oct. 12, 2010

(54) VARIABLE-MODE CONVERTER CONTROL CIRCUIT AND HALF-BRIDGE CONVERTER HAVING THE SAME

(75) Inventor: Hang-Seok Choi, Gyeonggi-do (KR)

(73) Assignee: Fairchild Korea Semiconductor, Ltd., Bucheon-Si (KR)

( * ) Notice: Subject to any disclaimer, the term of this patent is extended or adjusted under 35 U.S.C. 154(b) by 454 days.

(21) Appl. No.: 11/888,056

(22) Filed: Jul. 31, 2007

(65) Prior Publication Data

US 2008/0130328 A1    Jun. 5, 2008

(30) Foreign Application Priority Data

Dec. 5, 2006    (KR) ...................... 10-2006-0122421

(51) Int. Cl.
    *H02M 3/315* (2006.01)
(52) U.S. Cl. .......................... 363/97; 323/288; 323/354
(58) Field of Classification Search .................. 363/97, 363/16, 21.02–21.03; 323/284, 288, 902, 323/351, 354
    See application file for complete search history.

(56) References Cited

U.S. PATENT DOCUMENTS

| | | | |
|---|---|---|---|
| 4,956,761 A * | 9/1990 | Higashi ....................... 363/19 |
| 5,859,768 A * | 1/1999 | Hall et al. ................. 363/21.13 |
| 5,914,865 A * | 6/1999 | Barbehenn et al. ........ 363/21.15 |
| 6,295,217 B1 * | 9/2001 | Yang et al. ..................... 363/49 |
| 6,462,971 B1 * | 10/2002 | Balakrishnan et al. ........ 363/95 |
| 6,683,442 B1 * | 1/2004 | Ferencz et al. ............... 323/274 |
| 6,744,649 B1 * | 6/2004 | Yang et al. ..................... 363/98 |
| 6,836,414 B1 | 12/2004 | Batarseh et al. |
| 6,842,350 B2 * | 1/2005 | Yamada et al. ........... 363/21.16 |
| 7,529,105 B1 * | 5/2009 | Choi et al. ............... 363/21.12 |
| 2002/0167821 A1 | 11/2002 | Xing et al. |
| 2005/0057238 A1 * | 3/2005 | Yoshida ....................... 323/282 |

* cited by examiner

*Primary Examiner*—Harry Behm
(74) *Attorney, Agent, or Firm*—Sidley Austin LLP

(57) ABSTRACT

A converter control circuit applicable to various topologies of converters each employing two switching devices is disclosed. The converter control circuit includes an oscillator for generating a pulse signal and triangle-wave signal of a certain frequency, a switching control signal output unit for outputting a switching control signal to control ON/OFF of a plurality of switching devices based on a duty ratio determined from a feedback signal which is applied to a feedback terminal, a mode select signal generator for generating a mode select signal for determination of a control mode of a converter in response to the feedback signal applied to the feedback terminal, and a mode selecting unit for selecting the control mode in response to the mode select signal.

15 Claims, 5 Drawing Sheets

VARIABLE-MODE CONVERTER CONTROL CIRCUIT AND HALF-BRIDGE CONVERTER HAVING THE SAME

CROSS-REFERENCE TO RELATED APPLICATION

This application claims priority and the benefit of Korean Patent application No. 10-2006-0122421, filed in the Korean Intellectual Property Office on Dec. 5, 2006, the entire content of which is incorporated herein by reference.

BACKGROUND

1. Field of the Invention

The present invention relates to a converter control circuit and a converter having the same, and more particularly to a converter control circuit which is capable of changing an operation mode, and a half-bridge converter having the same.

2. Description of the Related Art

Recently, with the advance of electronic appliances, integrated circuit (IC) technologies have been utilized in these appliances to improve their performance while making their size and weight small. Further, the smallness and lightness of power supplies indispensable to such electronic appliances have also been required. Switched mode power supplies are mainly used as stabilized power supplies meeting such requirements. A direct current (DC)-DC converter, which is one of the switched mode power supplies, is a device for converting a given DC voltage into a voltage of a desired DC level. The DC-DC converter performs the voltage conversion by first converting a DC voltage into an alternating current (AC) voltage through a switching operation, and then stepping the converted AC voltage up or down through a transformer and rectifying the stepped-up or down AC voltage. This converter may be of various types including a forward type, flyback type, half-bridge type, and full-bridge type. An asymmetric pulse width modulation (PWM) half-bridge converter, resonant half-bridge converter, etc., derived from the half-bridge type among the various types, can reduce switching losses through zero voltage switching, so that they are widely used in applications requiring high efficiency.

Figure 1:
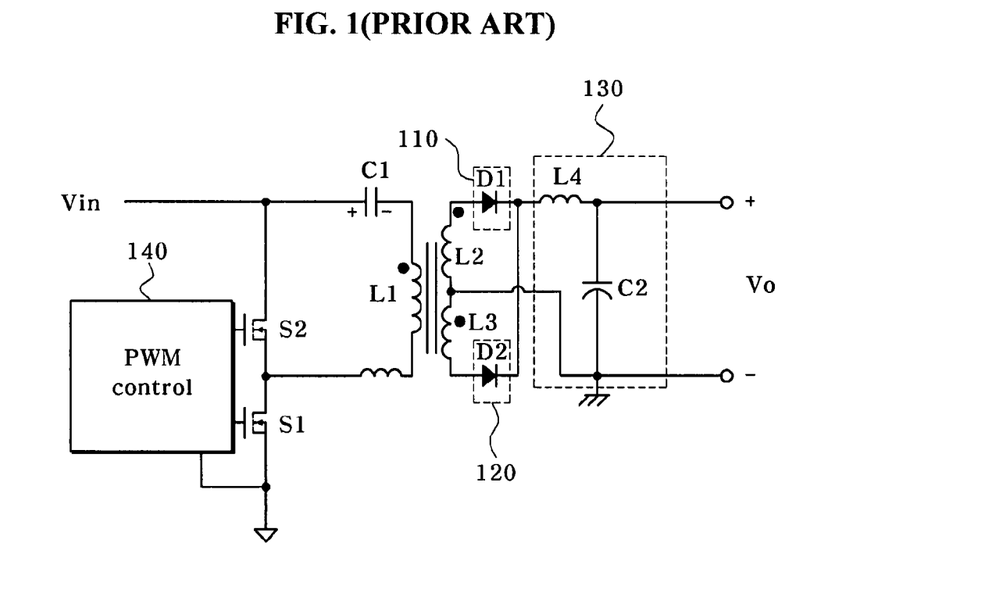
FIG. 1 is a circuit diagram of a conventional half-bridge DC-DC converter.

FIG. 1 is a circuit diagram showing the configuration of a conventional half-bridge DC-DC converter.

The conventional half-bridge DC-DC converter comprises a DC voltage source Vin for supplying a DC voltage, a first switching device S1 and second switching device S2 connected between both ends of the DC voltage source Vin, a first capacitor C1 connected to a connection point of the DC voltage source Vin and the second switching device S2, a transformer T having a primary winding L1 connected between the first terminal of the first capacitor C1 and a connection point of the first and second switching devices S1 and S2, a first rectifier 110 and second rectifier 120 connected to a first secondary winding L2 and second secondary winding L3 of the transformer T, respectively, a smoothing circuit 130 connected between output terminals of the first rectifier 110 and second rectifier 120 and a connection point of the first secondary winding L2 and second secondary winding L3, and a switching controller 140 for receiving a secondary voltage of the transformer T fed back thereto and controlling a switching operation of the first switching device S1 and the second switching device S2 based on the received secondary voltage. The first rectifier 110 and second rectifier 120 include a diode D1 and diode D2, respectively, and the smoothing circuit 130 includes an inductor L4 and a second capacitor C2.

Figure 2A:
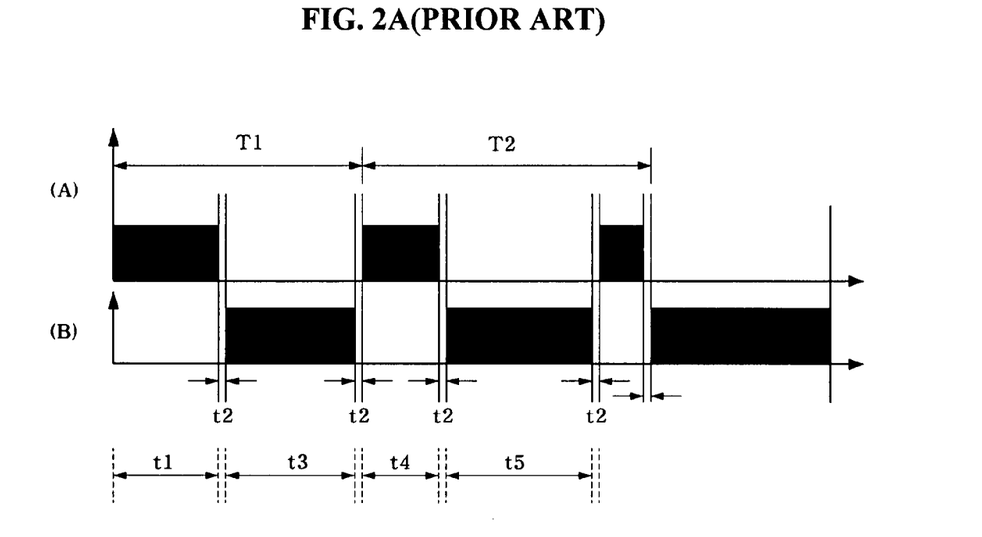
FIGS. 2A and 2B are timing diagrams of gating signals of a first switching device and a second switching device of the converter shown in FIG. 1.
Figure 2B:
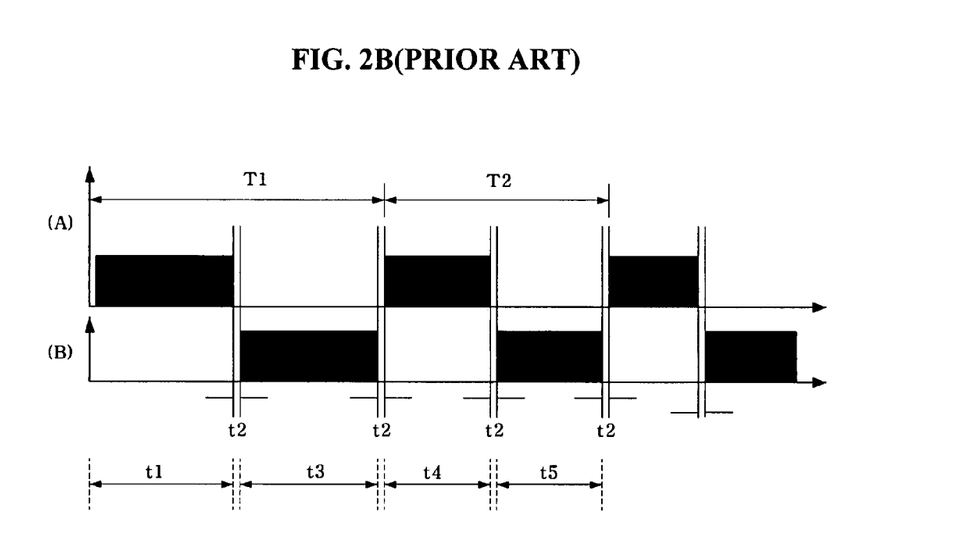

FIGS. 2A and 2B are timing diagrams illustrating the operations of the first switching device S1 and second switching device S2 of the converter shown in FIG. 1: FIG. 2A(A) and FIG. 2B(A) are timing diagrams of the first switching device S1, and FIG. 2A(B) and FIG. 2B(B) are timing diagrams of the second switching device S2.

The first switching device S1 is turned on for a predetermined time interval t1 by a switching control signal outputted from the switching controller 140. At the primary side of the transformer T a DC input voltage is generated from the DC voltage source Vin and a current loop through the first capacitor C1, the primary winding L1 of the transformer T, and the first switching device S1. As a result, the first capacitor C1 is charged. During this time interval t1, due to a voltage induced from the primary side of the transformer T, a current loop is formed at the secondary side of the transformer T through the first secondary winding L2 of the transformer T, the first diode D1, the inductor L4, and the second capacitor C2. Consequently, a DC output voltage Vo is supplied to a load (not shown).

Thereafter, the first switching device S1 and the second switching device S2 are turned off for a predetermined time interval t2 by the switching control signal from the switching controller 140. This time interval t2 is called a dead time t2. The dead time t2 is provided to prevent the input voltage Vin from being grounded or shorted, by inhibiting the second switching device S2 from being turned on at the same time that the first switching device S1 is turned off.

After the dead time t2, the second switching device S2 is turned on for a predetermined time interval t3 by the switching control signal outputted by the switching controller 140. As a result, the first capacitor C1 is discharged through a current loop through the second switching device S2 and the primary winding L1 of the transformer T. During this time interval, due to a voltage induced from the primary side of the transformer T, a current loop is formed at the secondary side of the transformer T through the second secondary winding L3 of the transformer T, the second diode D2, the inductor L4, and the second capacitor C2. Consequently, a DC output voltage Vo is supplied to a load (not shown).

The first switching device S1 and the second switching device S2 are controlled by the switching controller 140 in such a manner that they are alternately turned on for periods T1 and T2, excluding the dead time interval t2.

On the other hand, the output voltage of the converter is generally controlled in a duty ratio control mode (case of FIG. 2A) or frequency control mode (case of FIG. 2B). In the duty ratio control mode, the output voltage is controlled based on a duty cycle under the condition that a frequency is fixed. In the frequency control mode, the output voltage is controlled based on a switching frequency under the condition that a duty ratio is fixed to 50%. The frequency control mode is used in a resonant half-bridge converter, among various converters, whereas the duty ratio control mode is used in an asymmetric PWM half-bridge converter and an active clamp converter.

Because the asymmetric PWM half-bridge converter and the resonant half-bridge converter use the different control modes as stated above, they employ different control circuits. For this reason, where a system uses different converters, it must have different control circuits based on the used converters, resulting in the occurrence of various problems including increases in the size and manufacturing cost of the system. Therefore, there is a need for a multipurpose converter control circuit applicable to various topologies including the asymmetric PWM half-bridge converter, active clamp converter and resonant half-bridge converter.

SUMMARY

In accordance with an aspect of the present invention, a variable-mode converter control circuit comprises: an oscillating unit for generating a pulse signal and triangle-wave signal of a certain frequency; a switching control signal output unit for outputting a switching control signal to control ON/OFF of a plurality of switching devices based on a duty ratio determined from a feedback signal which is applied to a feedback terminal; a mode select signal generator for generating a mode select signal for determination of a control mode of a converter in response to the feedback signal applied to the feedback terminal; and a mode selecting unit for selecting the control mode in response to the mode select signal.

In some embodiments, the mode select signal generator comprises: a comparator for comparing a voltage at the feedback terminal with a predetermined reference voltage; and a flip-flop for outputting the mode select signal to the mode selecting unit in response to an output signal from the comparator.

The mode select signal generator may output the mode select signal to select a frequency control mode when the voltage at the feedback terminal is higher than the reference voltage, and to select a duty ratio control mode when the voltage at the feedback terminal is lower than the reference voltage.

The variable-mode converter control circuit may further comprise a soft-start block for performing a soft-start in the frequency control mode when the voltage at the feedback terminal is higher than the reference voltage, and in the duty ratio control mode when the voltage at the feedback terminal is lower than the reference voltage.

In some embodiments, the mode selecting unit comprises a switching device switched to a frequency control mode or duty ratio control mode in response to the mode select signal.

In accordance with another aspect of the present invention, a converter for converting a given direct current (DC) voltage into a voltage of a desired DC level comprises: a switching circuit for performing a switching operation in response to a switching control signal; a transformer for providing an output voltage induced based on a turn ratio thereof from a voltage inputted according to the switching operation of the switching circuit; a rectifying/smoothing circuit for rectifying and smoothing the output voltage from the transformer; a feedback circuit for detecting a level of a DC output voltage from the rectifying/smoothing circuit and generating a feedback signal of a level corresponding to the detected level; and a switching controller for outputting the switching control signal in response to the feedback signal from the feedback circuit to control the switching operation of the switching circuit.

In some embodiments, the switching circuit comprises a plurality of power MOSFETs connected in series to a DC voltage source for alternately switching a DC input voltage from the DC voltage source.

In some embodiments, the feedback circuit comprises: a transmitter including a light emitting diode, a resistor, and a shunt regulator connected in series, wherein the light emitting diode emits light based on the DC output voltage of the converter; and a receiver including a light receiving transistor for receiving the light from the light emitting diode and generating current corresponding to the received light.

The switching controller may comprise a variable-mode control circuit operating in a duty ratio control mode or frequency control mode depending on a configuration of the feedback circuit.

In some embodiments, the switching controller comprises: an oscillating unit for generating a pulse signal and triangle-wave signal of a certain frequency; a switching control signal output unit for outputting the switching control signal to control the switching operation of the switching circuit based on a duty ratio determined from the feedback signal, the feedback signal being applied from the feedback circuit to a feedback terminal; a mode select signal generator for generating a mode select signal for determination of a control mode of the converter in response to the feedback signal applied to the feedback terminal; and a mode selecting unit for selecting the control mode in response to the mode select signal.

In some embodiments, the switching controller further comprises an RT terminal, a CT terminal, and the feedback terminal, wherein the switching control signal output unit and the mode select signal generator are connected in common with the feedback terminal.

In some embodiments, the switching control signal output unit of the switching controller comprises a comparator for comparing a voltage at the feedback terminal with the triangle-wave signal and determining the duty ratio as a result of the comparison.

In some embodiments, the mode select signal generator of the switching controller comprises a comparator for comparing a voltage at the feedback terminal with a reference voltage and determining the control mode as a result of the comparison.

A resistor with a certain resistance may be connected to the RT terminal of the switching controller, so that a switching frequency is determined based on the amount of current flowing through the RT terminal, and a capacitor with a certain capacitance may be connected to the CT terminal of the switching controller, so that the switching frequency is determined based on the capacitance.

The switching controller may be operated in a frequency control mode when the feedback signal is inputted to the RT terminal and in a duty ratio control mode when the feedback signal is inputted to the feedback terminal.

DETAILED DESCRIPTION

Embodiments of the present invention will now be described in detail with reference to the accompanying drawings. The embodiments of the present invention have been disclosed for illustrative purpose only and should not be construed as limiting the scope of the present invention.

Figure 3:
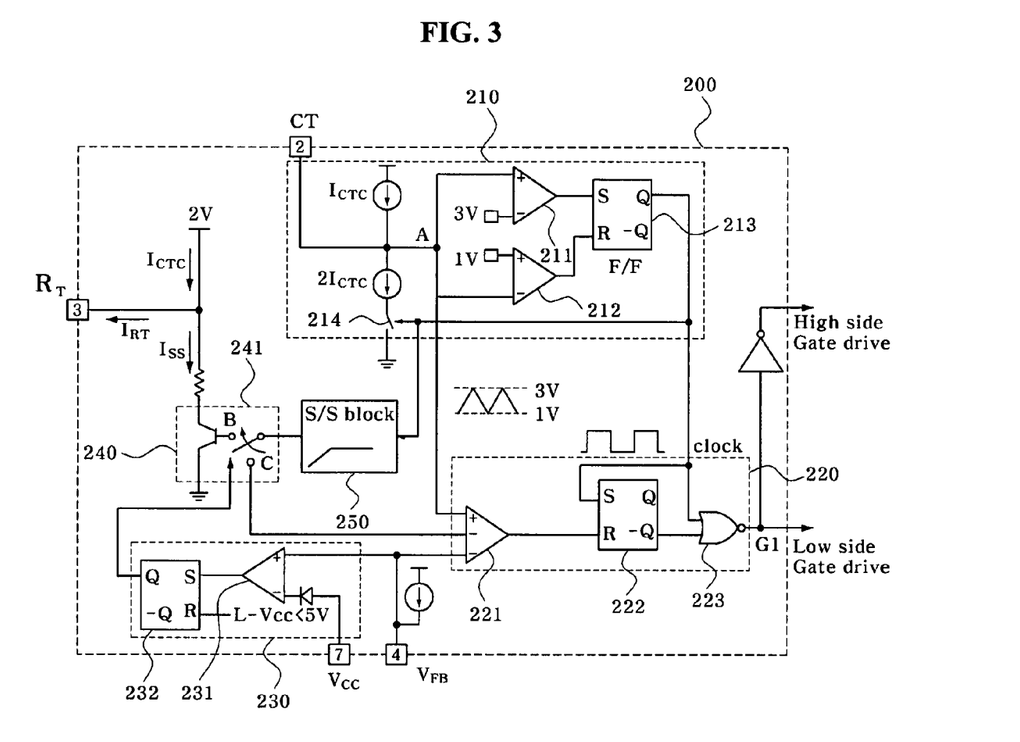
FIG. 3 is a circuit diagram of a control circuit for a half-bridge converter according to an embodiment of the present invention.

FIG. 3 is a circuit diagram of a variable-mode converter control circuit 200 according to an embodiment of the present invention.

The variable-mode converter control circuit 200 may comprise an oscillator 210 for generating a pulse signal and a triangle-wave signal of a certain frequency, a switching control signal output unit 220 for outputting a switching control signal to turn ON/OFF of a plurality of switching devices based on a duty ratio determined from a feedback signal Vfb, which is applied to a feedback terminal VFB, a mode select signal generator 230 for generating a mode select signal for determination of a control mode of a converter in response to the feedback signal Vfb applied to the feedback terminal VFB, and a mode selecting unit 240 for selecting the control mode in response to the mode select signal.

The oscillator 210 may include a first comparator 211, second comparator 212, RS flip-flop 213, and switch 214. The oscillator 210 can generate the triangle-wave signal and the pulse signal of the certain frequency from a constant current source. The pulse signal may act to determine turn-off periods of the switching devices. When a voltage at a node "A" is higher than a reference voltage, for example, 3V, the first comparator 211 can output a high signal and the second comparator 212 a low signal. As a result, the RS flip-flop 213 may output a high signal, thereby causing the switch 214 to be turned on. Consequently, a capacitor (not shown), connected to a CT terminal can begin to discharge, so that the voltage at the node A gradually falls. At the time that the voltage at the node A enters a range lower than 3V and higher than, for example, 1V as it gradually falls, the output of the first comparator 211 can make a high to low transition and the output of the second comparator 212 remains low. The output of the RS flip-flop remains high, the switch 214 is also kept on, and the voltage at the node A continues to fall. At the time that the voltage at the node A becomes lower than, for example, 1V, the output of the first comparator 211 remains low and the output of the second comparator 212 makes a low to high transition. As a result, the output of the RS flip-flop 213 is changed from high to low, thus turning off the switch 214. If the switch 214 is turned off, then the capacitor (not shown) connected to the CT terminal can begin to charge, so that the voltage at the node A rises again. With this operation repeated, the triangle-wave signal can be generated by the oscillator 210.

The switching control signal output unit 220 may output the switching control signal to turn on/off the switching devices essentially synchronously with the pulse signal generated by the oscillator 210. That is, the switching control signal output unit 220 can output the switching control signal in a square wave form using a comparator 221, RS flip-flop 222, and NOR gate 223 in response to the pulse signal generated by the oscillator 210 and the feedback signal Vfb inputted to the feedback terminal VFB, which will be described later in more detail.

The mode select signal generator 230 can include a comparator 231 for comparing the feedback signal Vfb at the feedback terminal VFB with a predetermined feedback reference voltage, and an RS flip-flop 232 for outputting the mode select signal to the mode selector 240 in response to an output signal from the comparator 231. With this configuration, the mode select signal generator 230 may generate the mode select signal for determination of the control mode of the converter.

When the feedback signal Vfb at the feedback terminal VFB is higher than the predetermined feedback reference voltage, for example, 4.5V, the comparator 231 can output a "high" signal. This high signal may be inputted to a set terminal S of the RS flip-flop 232, thereby causing the RS flip-flop 232 to output a high signal to the mode selector 240. Conversely, when the feedback signal Vfb at the feedback terminal VFB inputted to the comparator 231 is lower than 4.5V, the comparator 231 can output a "low" signal, so that the RS flip-flop 232 outputs a low signal. In other words, the mode select signal generator 230 may output a mode select signal for selection of a frequency control mode when the feedback signal Vfb at the feedback terminal VFB is higher than the feedback reference voltage, and a mode select signal for selection of a duty ratio control mode when the feedback signal Vfb at the feedback terminal VFB is lower than the feedback reference voltage.

The mode selecting unit 240 may include a switch 241 switched in response to the mode select signal inputted from the mode select signal generator 230 for selecting the control mode of the converter. When a high signal is inputted to the mode selecting unit 240, the switch 241 may be switched to a node B to select the frequency control mode. Conversely, when a low signal is inputted to the mode selecting unit 240, the switch 241 may be switched to a node C to select the duty ratio control mode.

The converter control circuit 200 may further comprise a soft-start block 250 for preventing an over-current when the switching operation is performed. The soft-start block 250 can be connected to the mode selecting unit 240. This soft-start block 250 may perform a soft-start in the frequency control mode when the feedback signal Vfb at the feedback terminal VFB is higher than the feedback reference voltage and in the duty ratio control mode when the feedback signal Vfb at the feedback terminal VFB is lower than the feedback reference voltage.

Although not shown, the converter control circuit 200 may further comprise a dead time generation circuit for preventing an input voltage Vin from being grounded or shorted due to simultaneous turning-on of the plurality of switching devices, for example, two switching devices, or various protection circuits for preventing the switching devices from being operated erroneously or damaged due to an under-voltage or over-current condition.

As described above, the variable-mode converter control circuit 200 according to the present embodiment can be operated in the frequency control mode or duty ratio control mode depending on the configuration of a feedback circuit of the converter. Therefore, one control circuit can be used for both an asymmetric PWM half-bridge converter and resonant half-bridge converter employing different control modes. Consequently, the present invention provides various advantages including reductions in the volume and manufacturing cost of the system.

Figure 4:
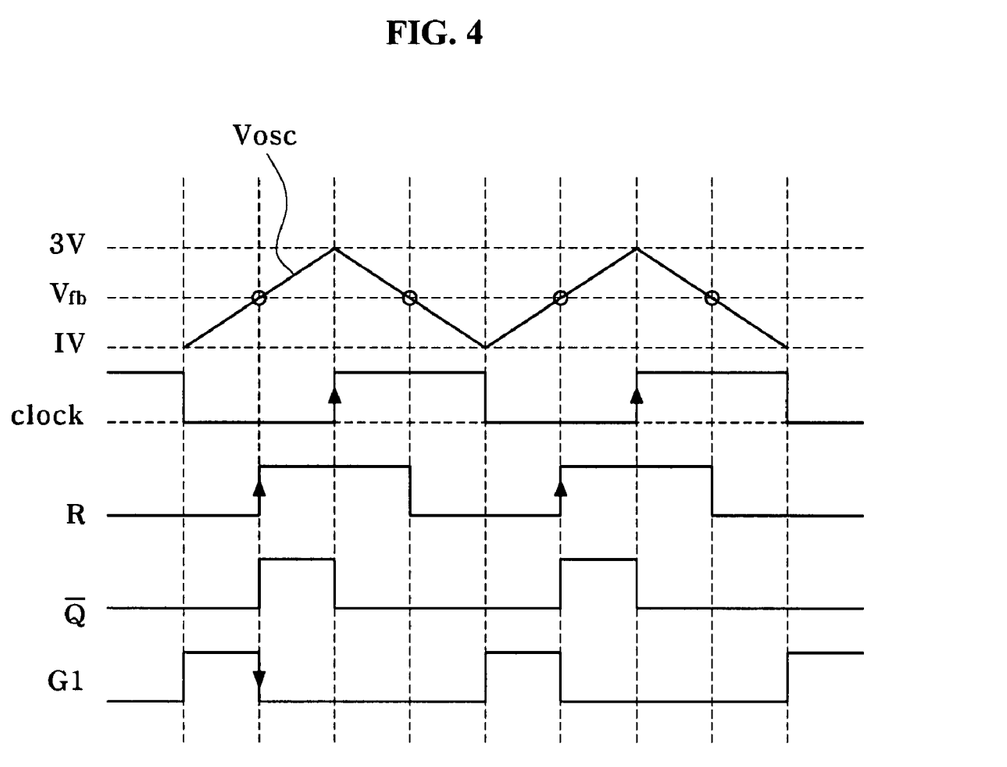
FIG. 4 is a timing diagram illustrating the operation of a switching control signal output unit of the converter control circuit shown in FIG. 3.

FIG. 4 is a timing diagram illustrating the operation of the switching control signal output unit (denoted by reference numeral 220 in FIG. 3) of the converter control circuit 200, shown in FIG. 3. The operation of the switching control signal output unit 220 will hereinafter be described with reference to FIG. 4 along with FIG. 3.

When a triangle-wave signal VOSC and clock signal clock from the oscillator 210 are inputted and the feedback signal Vfb is inputted to the feedback terminal VFB, the comparator 221 may output a signal corresponding to a lower level of one the inputted signals to a reset terminal R of the RS flip-flop 222. That is, when the feedback signal Vfb at the feedback terminal VFB is lower than the triangle-wave signal VOSC from the oscillator 210, the comparator 221 may output a high signal to the reset terminal R of the RS flip-flop 222. Conversely, when the triangle-wave signal VOSC is lower than the feedback signal Vfb at the feedback terminal VFB, the comparator 221 may output a low signal to the reset terminal R of the RS flip-flop 222.

The clock signal clock from the oscillator 210, which has a constant frequency, is fixedly inputted to a set terminal S of the RS flip-flop 222. As a result, at the moment when the clock signal clock rises from low to high, the output /Q of the RS flip-flop 222 falls from high to low.

The clock signal clock and the output /Q of the RS flip-flop 222 can be inputted to the NOR gate 223, which outputs a logical high switching control signal G1 only when both of its input signals are low. This switching control signal G1 can be inputted to a low side switching device, and also inverted and inputted to a high side switching device.

In this manner, the switching control signal G1 can have a duty ratio based on the feedback signal Vfb, which is applied to the feedback terminal VFB essentially synchronously with the clock signal clock of the oscillator 210.

Figure 5:
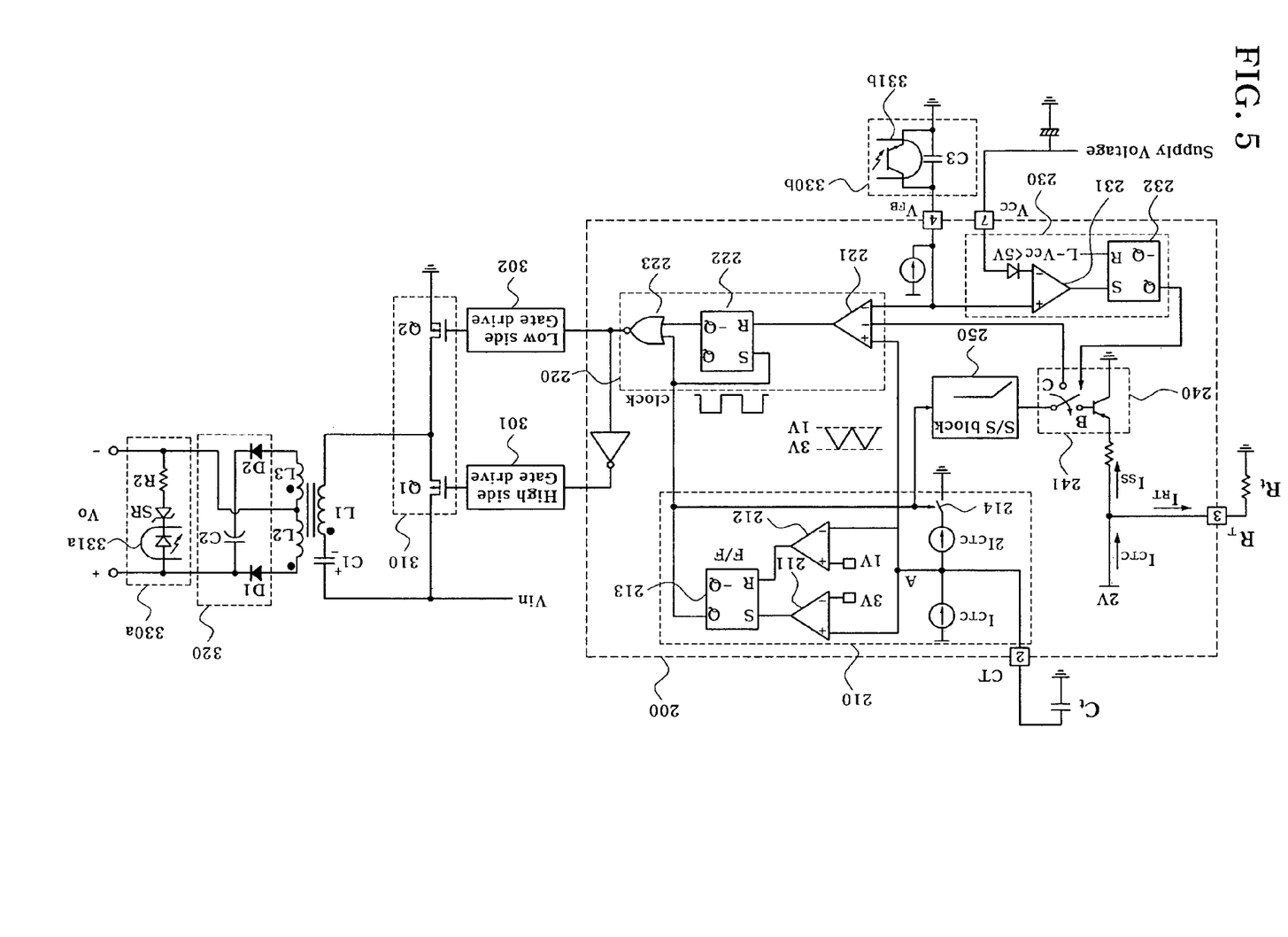
FIG. 5 is a circuit diagram of a half-bridge converter according to an embodiment of the present invention.

FIG. 5 is a circuit diagram of a half-bridge converter comprising the variable-mode converter control circuit shown in FIG. 3. The half-bridge converter of FIG. 5 is a converter of the duty ratio control mode. Some parts in FIG. 5 are the same as those in FIG. 3 and thus denoted by the same reference numerals.

The half-bridge converter of FIG. 5 may include a switching controller 200 for controlling a switching operation of a switching circuit 310, and a high side driver 301 and a low side driver 302 for applying drive signals to the switching circuit 310 in response to a switching control signal from the switching controller 200. The switching circuit 310 can perform the switching operation in response to the drive signals. The half-bridge converter of the present embodiment can further include a transformer T for providing an output voltage, which is induced based on a turn ratio of the transformer T from an input voltage inputted according to the switching operation of the switching circuit 310, a rectifying/smoothing circuit 320 for rectifying and smoothing the output voltage of the transformer T, and a feedback circuit 330 for detecting the level of the rectified and smoothed output voltage and generating a feedback signal of a level corresponding to the detected level.

The switching controller 200 can be switched to the frequency control mode or duty ratio control mode according to the control mode of a used converter and used in the switched mode, as stated previously with reference to FIG. 3. The switching controller 200 has an RT terminal, CT terminal, feedback terminal VFB, and supply voltage terminal Vcc. The switching controller 200 outputs a switching control signal to control ON/OFF of a first switching device Q1 and second switching device Q2 in the switching circuit 310 based on a duty ratio determined from a feedback signal Vfb which is applied to the feedback terminal VFB.

The high side driver 301 and the low side driver 302 may apply drive signals to the gates of the first switching device Q1 and second switching device Q2, respectively. These switching devices may be analogous to the switching devices S1 and S2 in FIG. 1.

The switching circuit 310 may include the first and second switching devices Q1 and Q2, which are connected in series to alternately switch the DC input voltage Vin. The first switching device Q1 and the second switching device Q2 may be implemented by power MOSFETs, respectively.

The first capacitor C1 can be connected between a connection point of a DC voltage source Vin and the second switching device Q2.

The transformer T may have a primary winding L1 connected between the first terminal of the first capacitor C1 and a connection point of the first and second switching devices Q1 and Q2. At the primary side, a voltage is applied across the transformer T as the switching devices Q1 and Q2 are alternately turned on/off, and transforms the applied voltage to a voltage of a level desired by a load at the secondary side of the transformer T.

The rectifying/smoothing circuit 320 may include the first rectifier D1 and the second rectifier D2, connected to the first secondary winding L2 and the second secondary winding L3 of the transformer T, respectively, and the smoothing capacitor C2 connected between output terminals of the first rectifier D1 and second rectifier D2 and a connection point of the first secondary winding L2 and the second secondary winding L3 of the transformer T. The first rectifier D1 and second rectifier D2 may be implemented by diodes.

The feedback circuit 330 may detect the level of a rectified and smoothed DC output voltage Vo, generate a feedback signal of a level corresponding to the detected level, and apply the feedback signal to the switching controller 200. A light emitting diode 331a of a photo coupler can emit light based on a difference between the output voltage Vo and a predetermined reference output voltage. In the present embodiment, the feedback circuit 330 can consist of a transmitter 330a and a receiver 330b. The transmitter 330a can include the light emitting diode 331a of the photo coupler, a resistor R2, and a shunt regulator SR, connected in series. The transmitter 330a can be connected in parallel across the second capacitor C2. The receiver 330b may include a third capacitor C3, and a light receiving transistor 331b of the photo coupler.

When the DC output voltage Vo exceeds a breakdown voltage across the shunt regulator SR and the resistor R2, current may flow through the light emitting diode 331a, the resistor R2 and the shunt regulator SR, so that the light emitting diode 331a emits light. The breakdown voltage may be related to the reference voltage in embodiments utilizing a Zener diode. The light emitted from the light emitting diode 331a can be received by the light receiving transistor 331b of the receiver 330b, thereby causing current of an amount corresponding to the level of the output voltage Vo to flow through the light receiving transistor 331b.

If the output voltage Vo rises, the amount of current flowing through the light receiving transistor 331b of the photo coupler increases, so that a feedback signal Vfb applied to the feedback terminal VFB falls. The duty ratio of the switching devices Q1 and Q2, i.e. a ratio of the pulse lengths of the switching devices Q1 and Q1, can be determined by comparing the feedback signal Vfb at the feedback terminal VFB with a triangle-wave voltage varying within the range of 1 to 3V. This triangle wave voltage maybe the voltage VOSC in FIG. 4. As a result, the duty ratio of the switching devices Q1 and Q2 reduces as the feedback signal Vfb at the feedback terminal VFB falls. Conversely, if the output voltage Vo falls, the amount of current flowing through the light receiving transistor 331b of the photo coupler decreases, so that the feedback signal Vfb applied to the feedback terminal VFB rises. Consequently, the duty ratio of the switching devices Q1 and Q2 increases.

The frequency of the switching control signal outputted from the switching controller 200 can be determined based on the resistance of a resistor Rt connected to the RT terminal of the switching controller 200 and the capacitance of a capacitor Ct connected to the CT terminal of the switching controller 200. That is, the frequency of the switching control signal can be determined by a time constant expressed by a product of the resistance of the resistor Rt and the capacitance of the capacitor Ct. If the resistance and capacitance are fixed at certain values, the frequency of the switching control signal becomes constant.

As described above, in the converter of the duty ratio control mode according to the present embodiment, the duty ratio of the switching devices Q1 and Q2 can be controlled depending on a signal inputted to the feedback terminal VFB of the switching controller 200 by disposing the feedback circuit 330b at the feedback terminal VFB and fixing the RT terminal and CT terminal at desired resistance and capacitance, respectively.

This converter may comprise a current detection resistor for detecting a switching output signal to prevent the switching devices Q1 and Q2 from being operated under an over-current condition, and a filter for removing a high-frequency component from the switching output signal.

Figure 6:
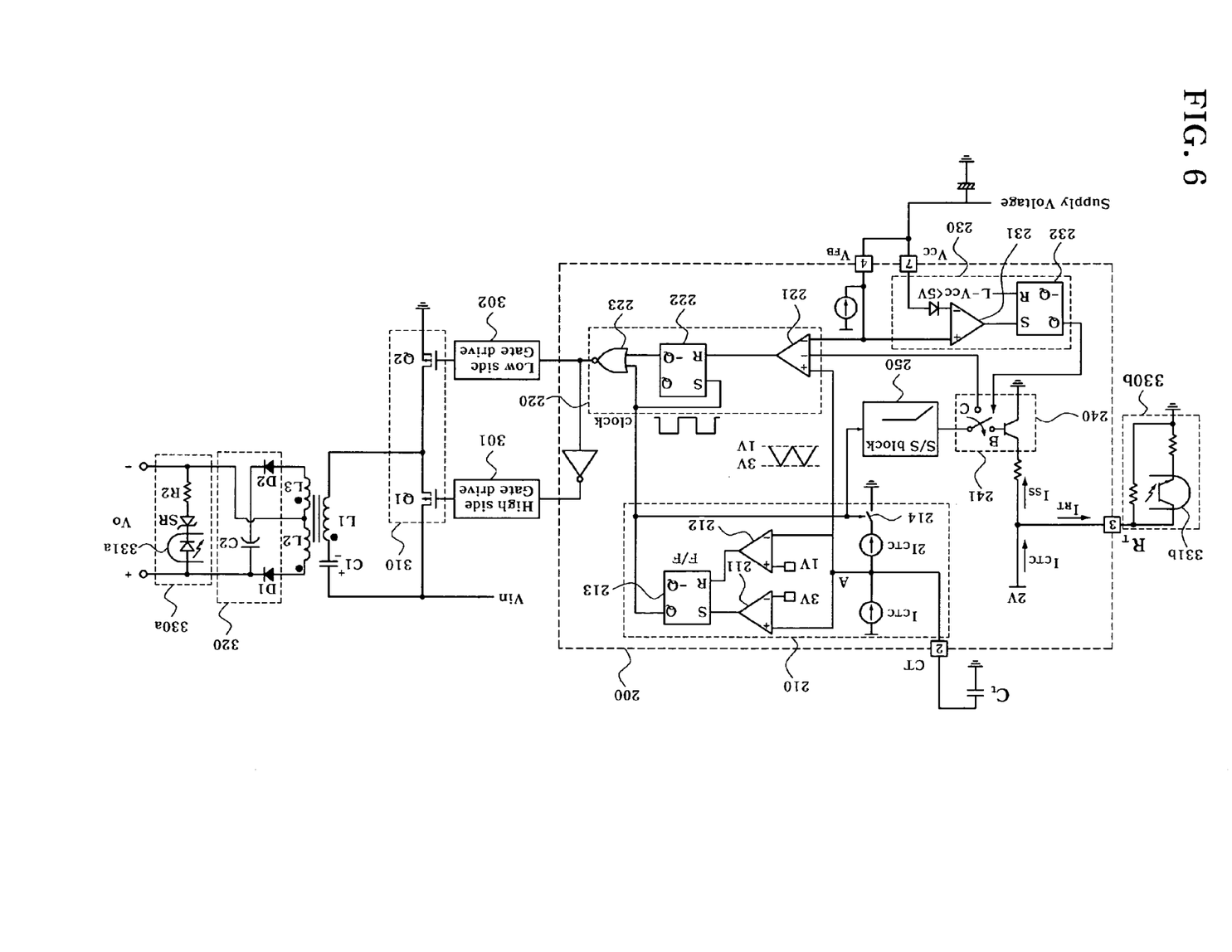
FIG. 6 is a circuit diagram of a half-bridge converter according to another embodiment of the present invention.

FIG. 6 is a circuit diagram of a half-bridge converter according to an embodiment of the present invention. The half-bridge converter of FIG. 6 is a converter of the frequency control mode. Some parts in FIG. 6 are analogous to those in FIG. 5 and thus denoted by the same reference numerals.

In this embodiment, the receiver 330b of the feedback circuit 300, which generates a feedback signal of a level corresponding to the level of a DC output voltage Vo of the converter, can be connected to the RT terminal of the switching controller 200. Because the feedback terminal VFB of the switching controller 200 is fixedly connected to a supply voltage terminal Vcc, a feedback signal at the feedback terminal VFB is maintained at an essentially constant level.

A current of an amount, corresponding to the level of the converter output voltage Vo, can flow through the light receiving transistor 331b of a photo coupler. In detail, the current of the amount corresponding to the level of the DC output voltage Vo can flow through the light receiving transistor 331b based on a signal, transmitted from the light emitting diode 331a of the photo coupler to the light receiving transistor 331b. If the current flows through the light receiving transistor 331b, the resistance of the RT terminal of the switching controller 200 varies, so that a switching frequency varies. In other words, in this embodiment the feedback signal from the feedback circuit 300 is inputted to the RT terminal of the switching controller 200, so that the switching controller 200 is operated in the frequency control mode, thus controlling the frequency of a switching control signal.

This converter may comprise a current detection resistor for detecting a switching output signal to prevent the converter from being operated under an over-current condition, and a filter for removing a high-frequency component from the switching output signal.

Other components of the frequency control mode converter can be the same as those of the duty ratio control mode converter shown in FIG. 5, and a description thereof will thus be omitted.

As described above, in the converter of the frequency control mode according to the present embodiment, the switching frequency of the switching devices Q1 and Q2 can be controlled depending on a feedback signal corresponding to the output voltage Vo, inputted to the RT terminal of the switching controller, by inputting the feedback signal Vfb to the RT terminal and fixing the inputs of the feedback terminal VFB and CT terminal to desired values.

As apparent from the above description, in embodiments a variable-mode converter control circuit can be switched to either a frequency control mode or a duty ratio control mode, using a voltage applied to a feedback terminal and operated in the switched control mode. Therefore, one control circuit can be used for both an asymmetric PWM half-bridge converter and resonant half-bridge converter. Consequently, embodiments provide various advantages including reductions in the size and manufacturing cost of a system. Furthermore, in a converter comprising the variable-mode converter control circuit of the present invention, a desired resistance, capacitance and feedback signal can be applied to an RT terminal, CT terminal and feedback terminal of a switching controller, so that the duty ratio or switching frequency of switching devices can be controlled based on the feedback signal.

Although particular embodiments of the present invention have been disclosed for illustrative purposes, those skilled in the art will appreciate that various modifications, additions and substitutions are possible without departing from the scope and spirit of the invention, which is disclosed in the accompanying claims.

What is claimed is:

1. A variable-mode converter control circuit for a power converter comprising:
   an oscillating unit, configured to generate a pulse signal and triangle-wave signal of a certain frequency;
   a switching control signal output unit, configured to output a switching control signal to control an ON/OFF of a plurality of switching devices based on a duty ratio determined from a feedback signal, which is applied to a feedback terminal synchronously with the pulse signal of the oscillating unit;
   a mode select signal generator, configured to generate a mode select signal for a determination of a control mode of the converter in response to the feedback signal applied to the feedback terminal, wherein the control mode is either a frequency control mode or a duty ratio control mode;
   a mode selecting unit, configured to select one of the frequency control mode or the duty ratio control mode as the control mode of the converter in response to the mode select signal; and
   a configuration terminal, wherein the converter is configured to operate in the frequency control mode when the feedback signal is inputted to the configuration terminal;
   wherein the configuration terminal comprises an RT terminal, the converter further comprising:
   a resistor, connected to the RT terminal, so that a switching frequency is determined based on the amount of current flowing through the RT terminal; and
   a capacitor, connected to a CT terminal, so that the switching frequency is determined based on the capacitance.

2. The variable-mode converter control circuit according to claim 1, wherein the mode select signal generator comprises:
   a comparator, configured to compare a voltage at the feedback terminal with a predetermined reference voltage; and
   a flip-flop, configured to output the mode select signal to the mode selecting unit in response to an output signal from the comparator.

3. The variable-mode converter control circuit according to claim 2, wherein the mode select signal generator outputs the mode select signal
   to select a frequency control mode when the voltage at the feedback terminal is higher than the reference voltage; and
   to select a duty ratio control mode when the voltage at the feedback terminal is lower than the reference voltage.

4. The variable-mode converter control circuit according to claim 2, further comprising a soft-start block configured to perform a soft-start in the frequency control mode when the voltage at the feedback terminal is higher than the reference voltage, and in the duty ratio control mode when the voltage at the feedback terminal is lower than the reference voltage.

5. The variable-mode converter control circuit according to claim 1, wherein the mode selecting unit comprises a switch, capable of switching to the frequency control mode or the duty ratio control mode in response to the mode select signal.

6. A converter configured to convert a direct current (DC) voltage into a voltage of a desired DC level, comprising:
  a switching circuit, configured to perform a switching operation in response to a switching control signal;
  a transformer, configured to provide an output voltage induced based on a turn ratio thereof from a voltage inputted according to the switching operation of the switching circuit;
  a rectifying/smoothing circuit, configured to rectify and smooth the output voltage of the transformer;
  a feedback circuit, configured to detect a level of a DC output voltage from the rectifying/smoothing circuit and generating a feedback signal of a level corresponding to the detected level;
  a switching controller, configured to output the switching control signal in response to the feedback signal from the feedback circuit to control the switching operation of the switching circuit, wherein the switching controller comprises a variable-mode converter control circuit configured to be operable in either a duty ratio control mode or in a frequency control mode depending on a configuration of the feedback circuit; and
  a configuration terminal, wherein the variable-mode converter control circuit is configured to operate in the frequency control mode when the feedback signal is inputted to the configuration terminal;
  wherein the configuration terminal comprises an RT terminal, the converter further comprising:
    a resistor, connected to the RT terminal, so that a switching frequency is determined based on the amount of current flowing through the RT terminal; and
    a capacitor, connected to a CT terminal, so that the switching frequency is determined based on the capacitance.

7. The converter according to claim 6, wherein the switching circuit comprises two power MOSFETs connected in series across the DC voltage source, the switching circuit configured to alternately switch the power MOSFETs in a complementary manner.

8. The converter according to claim 6, wherein the feedback circuit comprises:
  a transmitter, including a light emitting diode, a resistor, and a shunt regulator, connected in series, the light emitting diode emitting light based on the DC output voltage from the rectifying/smoothing circuit; and
  a receiver, including a light receiving transistor, configured to receive the light from the light emitting diode and to generate current corresponding to the received light.

9. The converter according to claim 6, wherein the switching controller comprises:
  an oscillator configured to generate a pulse signal and triangle-wave signal of a certain frequency;
  a switching control signal output unit configured to output the switching control signal to control the switching operation of the switching circuit based on a duty ratio determined from the feedback signal, the feedback signal being applied from the feedback circuit to a feedback terminal synchronously with the pulse signal from the oscillator;
  a mode select signal generator configured to generate a mode select signal for determination of a control mode of the converter in response to the feedback signal applied to the feedback terminal; and
  a mode selector configured to select the control mode in response to the mode select signal.

10. The converter according to claim 9, wherein the switching control signal output unit and the mode select signal generator are connected in common with the feedback terminal.

11. The converter according to claim 10, wherein the switching control signal output unit comprises a comparator configured to compare a voltage at the feedback terminal with the triangle-wave signal and to determine the duty ratio as a result of the comparison.

12. The converter according to claim 10, wherein the mode select signal generator comprises a comparator configured to compare a voltage at the feedback terminal with a reference voltage and to determine the control mode as a result of the comparison.

13. The converter according to claim 10, wherein the switching controller is configured to operate in a duty ratio control mode when the feedback signal is inputted to the feedback terminal.

14. A converter configured to convert a direct current (DC) voltage into a voltage of a desired DC level, comprising:
  a switching circuit, configured to perform a switching operation in response to a switching control signal;
  a transformer, configured to provide an output voltage induced based on a turn ratio thereof from a voltage inputted according to the switching operation of the switching circuit;
  a rectifying/smoothing circuit, configured to rectify and smooth the output voltage of the transformer;
  a feedback circuit, configured to detect a level of a DC output voltage from the rectifying/smoothing circuit and generating a feedback signal of a level corresponding to the detected level; and
  a switching controller, configured to output the switching control signal in response to the feedback signal from the feedback circuit to control the switching operation of the switching circuit, wherein the switching controller comprises:
    an oscillator configured to generate a pulse signal and triangle-wave signal of a certain frequency;
    a switching control signal output unit configured to output the switching control signal to control the switching operation of the switching circuit based on a duty ratio determined from the feedback signal, the feedback signal being applied from the feedback circuit to a feedback terminal synchronously with the pulse signal from the oscillator;
    a mode select signal generator configured to generate a mode select signal for determination of a control mode of the converter in response to the feedback signal applied to the feedback terminal;
    a mode selector configured to select the control mode in response to the mode select signal; and
    an RT terminal and a CT terminal;
  wherein the switching control signal output unit and the mode select signal generator are connected in common with the feedback terminal;
  wherein the switching controller is configured to operate in a frequency control mode when the feedback signal is inputted to the RT terminal.

15. A variable-mode converter control circuit for a power converter comprising:
  an oscillator, configured to generate a pulse signal and triangle-wave signal of a certain frequency;
  a mode selector, configured to select a control mode of the converter, depending on a feedback signal, wherein the control mode is either a frequency control mode or a duty ratio control mode;

a switching controller, coupled to the oscillator and the mode selector, configured to output a switching control signal to control a switching operation of a plurality of switching devices;

wherein the converter is configured to operate in the control mode selected by the mode selector; and a configuration terminal, wherein the converter is configured to operate in the frequency control mode when the feedback signal is inputted to the configuration terminal;

wherein the configuration terminal comprises an RT terminal, the converter further comprising:

a resistor, connected to the RT terminal, so that a switching frequency is determined based on the amount of current flowing through the RT terminal; and a capacitor, connected to a CT terminal, so that the switching frequency is determined based on the capacitance.

\* \* \* \* \*